United States Patent
Torre et al.

(10) Patent No.: US 9,853,449 B2
(45) Date of Patent: *Dec. 26, 2017

(54) SMART TRANSFORMER

(71) Applicant: San Diego Gas & Electric Company, c/o Sempra Energy, San Diego, CA (US)

(72) Inventors: William Vincent Torre, Chula Vista, CA (US); Amanda Louise Myers, Chula Vista, CA (US); Michael James Colburn, San Diego, CA (US)

(*) Notice: Subject to any disclaimer, the term of this patent is extended or adjusted under 35 U.S.C. 154(b) by 266 days.

This patent is subject to a terminal disclaimer.

(21) Appl. No.: 14/664,657

(22) Filed: Mar. 20, 2015

(65) Prior Publication Data

US 2015/0194810 A1    Jul. 9, 2015

Related U.S. Application Data

(63) Continuation of application No. 13/214,625, filed on Aug. 22, 2011, now Pat. No. 9,020,654, which is a
(Continued)

(51) Int. Cl.
*H02J 3/00* (2006.01)
*G06Q 50/06* (2012.01)
(Continued)

(52) U.S. Cl.
CPC .............. *H02J 3/005* (2013.01); *G05B 15/02* (2013.01); *G06Q 50/06* (2013.01); *H02H 7/04* (2013.01);
(Continued)

(58) Field of Classification Search
CPC .......... H02J 3/005; Y04S 10/16; G06Q 50/06; Y02T 10/7283; B60L 15/2045;
(Continued)

(56) References Cited

U.S. PATENT DOCUMENTS 6,512,966 B2    1/2003 Lof et al.
6,545,482 B1    4/2003 Fedirchnk et al.
(Continued)

FOREIGN PATENT DOCUMENTS

CN        101799684 A    8/2010

OTHER PUBLICATIONS

European Patent Office, Extended European Search Report, Sep. 5, 2016, pp. 1-8.
(Continued)

*Primary Examiner* — Crystal J Barnes-Bullock
(74) *Attorney, Agent, or Firm* — Sheppard, Mullin, Richter & Hampton LLP

(57) ABSTRACT

The present invention provides a system and computer program product for implementing a smart transformer, comprising a processor, and a balancing algorithm residing on the processor, wherein the balancing algorithm is stored on a non-transitory computer readable medium having computer executable program code embodied thereon, the computer executable program code configured to cause the system to monitor and control an electric customer load and generation in order to optimize the performance of a distribution transformer, wherein the processor receives a plurality of system inputs and uses the balancing algorithm to determine a rating of the transformer and an amount of customer load.

15 Claims, 7 Drawing Sheets

Related U.S. Application Data continuation of application No. 12/899,412, filed on Oct. 6, 2010, now Pat. No. 8,024,077.

(51) Int. Cl.
*H02H 7/04* (2006.01)
*G05B 15/02* (2006.01)
*H02H 3/02* (2006.01)

(52) U.S. Cl.
CPC ............ *H02H 3/025* (2013.01); *Y02E 60/723* (2013.01); *Y04S 10/16* (2013.01)

(58) Field of Classification Search
CPC ........ Y02E 60/723; H02H 3/025; H02H 7/04; G05B 15/02
See application file for complete search history.

(56) References Cited

U.S. PATENT DOCUMENTS

| | | | |
|---|---|---|---|
| 6,711,512 B2 | 3/2004 | Noh | |
| 6,906,630 B2 | 6/2005 | Georges et al. | |
| 6,979,916 B2 | 12/2005 | Schienbein et al. | |
| 7,209,839 B2* | 4/2007 | Roytelman | H02J 3/06 324/222 |
| 7,218,998 B1 | 5/2007 | Neale | |
| 7,627,453 B2 | 12/2009 | Keefe et al. | |
| 7,675,427 B2 | 3/2010 | Deaver, Sr. et al. | |
| 7,701,357 B2 | 4/2010 | Deaver, Sr. et al. | |
| 7,734,380 B2 | 6/2010 | Ransom et al. | |
| 7,804,280 B2 | 9/2010 | Deaver, Sr. et al. | |
| 8,116,915 B2* | 2/2012 | Kempton | B60L 11/1824 180/65.1 |
| 9,020,654 B2* | 4/2015 | Torre | G06Q 50/06 323/247 |
| 9,026,256 B2* | 5/2015 | Biswal | H02J 3/48 340/635 |
| 2006/0007016 A1 | 1/2006 | Borkowski et al. | |
| 2009/0222143 A1 | 9/2009 | Kempton | |
| 2010/0301833 A1 | 12/2010 | Foster | |
| 2011/0101777 A1 | 5/2011 | Jansma | |

OTHER PUBLICATIONS

Jean-Philippe Vasseur et al., Interconnecting Smart Objects with IP. The Next Internet, Jun. 15, 2010, pp. 305-324.
Hasselfield et al., An automated method for least cost distribution planning, IEEE Transactions on Power Delivery, Apr. 1990, pp. 1188-1194, vol. 5, No. 2.
Australian Government IP Australia, Patent Examination Report No. 1 for AU Patent Application No. 2011312699, Jun. 12, 2015, pp. 1-3.
State Intellectual Property Office of PRC, Notification of Second Office Action for CN Application No. 201180058798.X, May 28, 2015, pp. 1-6.

* cited by examiner

SMART TRANSFORMER

REFERENCE TO RELATED APPLICATIONS

This application is a continuation of U.S. patent application Ser. No. 13/214,625, filed on Aug. 22, 2011, which is a continuation of U.S. patent application Ser. No. 12/899,412, filed on Oct. 6, 2010, the contents of which are incorporated herein by reference in their entireties.

FIELD OF THE INVENTION

The present invention relates generally to energy monitoring and more particularly to a system and computer program product for implementing a smart transformer.

BACKGROUND OF THE INVENTION

Due in part to the technology of Electric Vehicles, and other Smart Grid opportunities, the loads of the future are expected to be vastly different from the loads of today. As such, utilities may begin to see daily peaks move, or level out, due to the expected increased loading patterns. Although the full system load is an issue, the problem at hand concerns the load specific to an individual distribution transformer. Currently, transformer sizing in residential applications may be based on a number of assumptions. One assumption may entail an average load based on home size, while a second assumption may entail a peak period (e.g., four hours). As a result of the charging of electric vehicles, the amount of load on a distribution transformer could potentially double, as well as increase the peak period to well past four hours. Accordingly, an increased loss of life in distribution transformers is expected going forward, as well as a much greater potential for transformer failure.

Currently, there is no known way of monitoring and controlling the real-time load on a distribution transformer. Overload situations may be detected in two ways. In some cases, a customer calls in with voltage issues, sparking an investigation and subsequent upgrade of the transformer in the case that it is overloaded. In cases where the transformer fails, it may be upgraded if overloading is the expected cause. Both cases involve treating the problem with reactionary measures. As such, a proactive solution is sought that uses Smart Grid technology with the goal of running the system in the most efficient and cost effective way possible.

BRIEF SUMMARY OF EMBODIMENTS OF THE INVENTION

The present invention is directed toward a system and computer program product for implementing a smart transformer. The system and computer program product are configured to monitor and control electric customer load and generation in order to optimize the performance of distribution transformers.

One embodiment of the invention involves a system for implementing a smart transformer, comprising a processor, and a balancing algorithm residing on the processor, wherein the balancing algorithm is stored on a non-transitory computer readable medium having computer executable program code embodied thereon, the computer executable program code configured to cause the system to monitor and control an electric customer load and generation in order to optimize the performance of a distribution transformer, wherein the processor receives a plurality of system inputs and uses the balancing algorithm to determine a rating of the transformer and an amount of customer load.

In some embodiments, the plurality of system inputs may comprise five or more inputs selected from the group consisting of: system load; transformer load; transformer type, size, and vintage; humidity; ambient temperature of transformer; transformer GPS location; price signals; individual customer load; specific equipment load; distributed generation output and type; voltage; and date/time. In operation, the processor uses the balancing algorithm to determine an optimum dispatch of load that will prevent overload of the distribution transformer. The processor receives a plurality of user inputs comprising two or more user inputs selected from the group consisting of: loading guidelines; interval; nameplate KVA; and voltage. The loading guidelines include % rated KVA allowed as a decimal based on hot spot temperature, oil temperature, and ambient temperature.

The above-described system may further comprise a distribution transformer monitor for measuring at least the current, voltage, and ambient temperature of the transformer. In some cases, the processor receives distributed generation values representing all customer distributed generation off of the transformer including at least photovoltaic systems and battery storage. The processor sends a busy signal to the customer if the current load is exceeding the loading guidelines, and distributed generation is unavailable. In some embodiments, the transformer is placed in a waiting mode if the processor detects a possible transformer overload, whereby the processor is thereby blocked from normal operation. Device priority is used to determine when the transformer moves out of the waiting mode and is allowed to resume normal operation.

Another embodiment of the present invention involves a non-transitory computer readable medium having computer executable program code embodied thereon, the computer executable program code configured to cause a processor to monitor and control an electric customer load and generation in order to optimize the performance of a distribution transformer, by performing the steps of: (i) receiving a plurality of system inputs; (ii) utilizing a balancing algorithm to determine a rating of the transformer and an amount of customer load; and (iii) utilizing the balancing algorithm to determine an optimum dispatch of load that will prevent overload of the distribution transformer.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention.

These figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a system and computer program product for implementing a smart transformer. The system and computer program product are configured to monitor and control electric customer load and generation in order to optimize the performance of distribution transformers.

Figure 1:
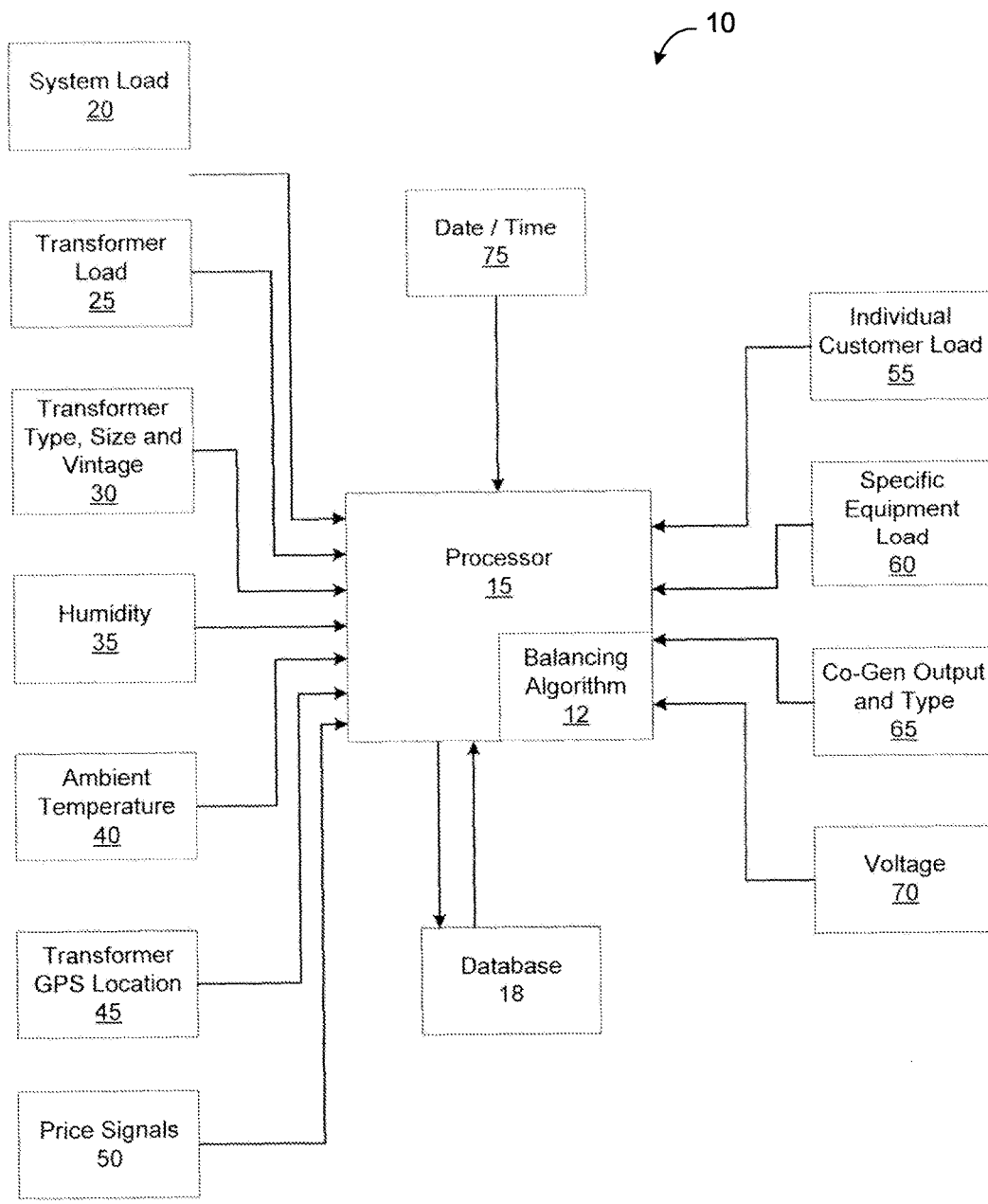
FIG. 1 is a flowchart illustrating the basic system architecture of a system and computer program product for implementing a smart transformer, in accordance with an embodiment of the present invention.

FIG. 1 is a diagram depicting the basic system architecture of a system 10 and computer program product for implementing a smart transformer, in accordance with an embodiment of the present invention. The system 10 includes a balancing algorithm 12 residing on a processor 15 and a database 18 for storing various system, utility and customer information. In particular, the balancing algorithm 12 is stored on a non-transitory computer readable medium having computer executable program code embodied thereon, the computer executable program code configured to cause the system to monitor and control electric customer load and generation in order to optimize the performance of distribution transformers.

In the illustrated embodiment, various inputs to the system include, but are not limited to: (i) System Load 20, (ii) Transformer Load 25, (iii) Transformer Type, Size, and Vintage 30, (iv) Humidity 35 (present and historical), (v) Ambient Temperature 40 of transformer (present and historical), (vi) Transformer GPS Location 45 (vii) Price Signals 50, (viii) Individual Customer Load 55 (total per house), (ix) Specific Equipment Load 60 (e.g., electric vehicle charging), (x) Distributed Generation Output and Type 65, (xi) Voltage 70, and (xii) Date/Time 75. As would be appreciated by those of ordinary skill in the art, any number of additional system inputs may be employed without departing from the scope of the invention. Additionally, some embodiments of the invention may entail a similar system having only a subset of the system inputs depicted in FIG. 1.

With further reference to FIG. 1, the processor 15 receives the various system inputs 20, 25, 30, 35, 40, 45, 50, 55, 60, 65, 70, 75 and uses the balancing algorithm 12 to determine the rating of the transformer and the amount of customer load. Then, the processor 15 uses the balancing algorithm 12 to determine the optimum dispatch of load which will prevent overload of the distribution transformer, while minimizing impact to the customer. Communications may take place using Home Automation Network (HAN) devices or other means of communication.

According to various embodiments of the invention, user inputs may include, but are not limited to: (i) Loading Guidelines, (ii) Interval, (iii) Nameplate KVA (Kilovolt-Ampere), and (iv) Voltage. The appropriate utility may set the Loading Guidelines, which may include, e.g., % rated KVA allowed as a decimal based on Hot Spot Temperature, Oil Temperature, and Ambient Temperature. Of course, the Loading Guidelines will vary based upon whether the transformer is a (i) Single Phase UG Transformer, (ii) Pole Mount Transformer (4 hour Peak Load Profile), or (iii) Pole Mount Transformer (8 hour Peak Load Profile). In some embodiments, the Hot Spot Temperature, Oil Temperature, and Ambient Temperature values are automatically associated with each system transformer within the database 18 such that the appropriate Loading Guidelines may be selected while "balancing" the transformer.

Another user input may comprise Interval, which can be defined as how often the utility would like the "Interval Process" to run. With respect to Nameplate KVA, the utility should ensure that this value is stored in the database 18 for each transformer on the system. Regarding Voltage, the utility should ensure that the secondary voltage level is stored in the database 18 for each transformer on the system.

Figure 2:
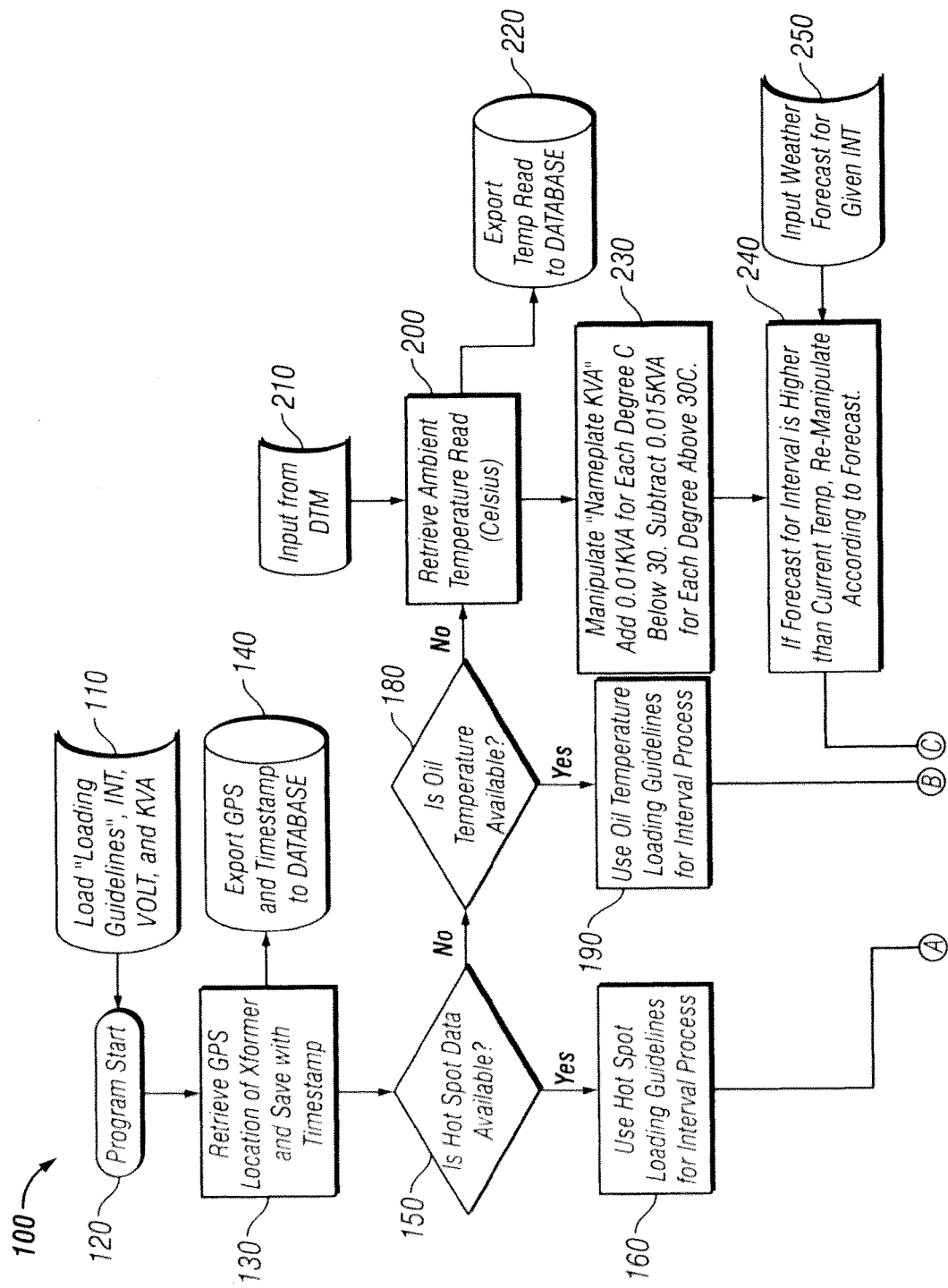
FIG. 2 is a flowchart illustrating an Interval Process 100 for monitoring and controlling electric customer load and generation in order to optimize the performance of a distribution transformer, in accordance with an embodiment of the present invention.
Figure 2:
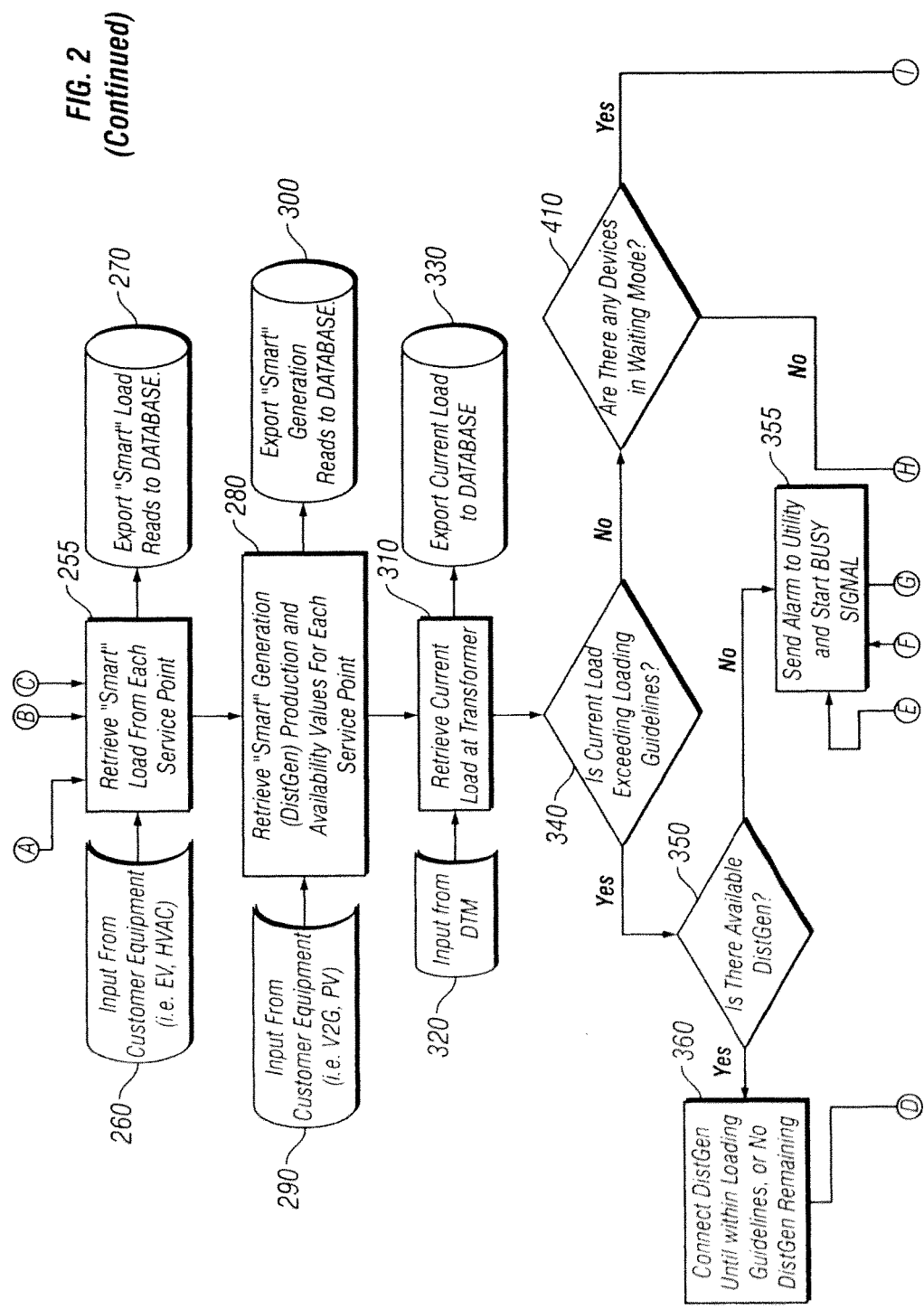
Figure 2:
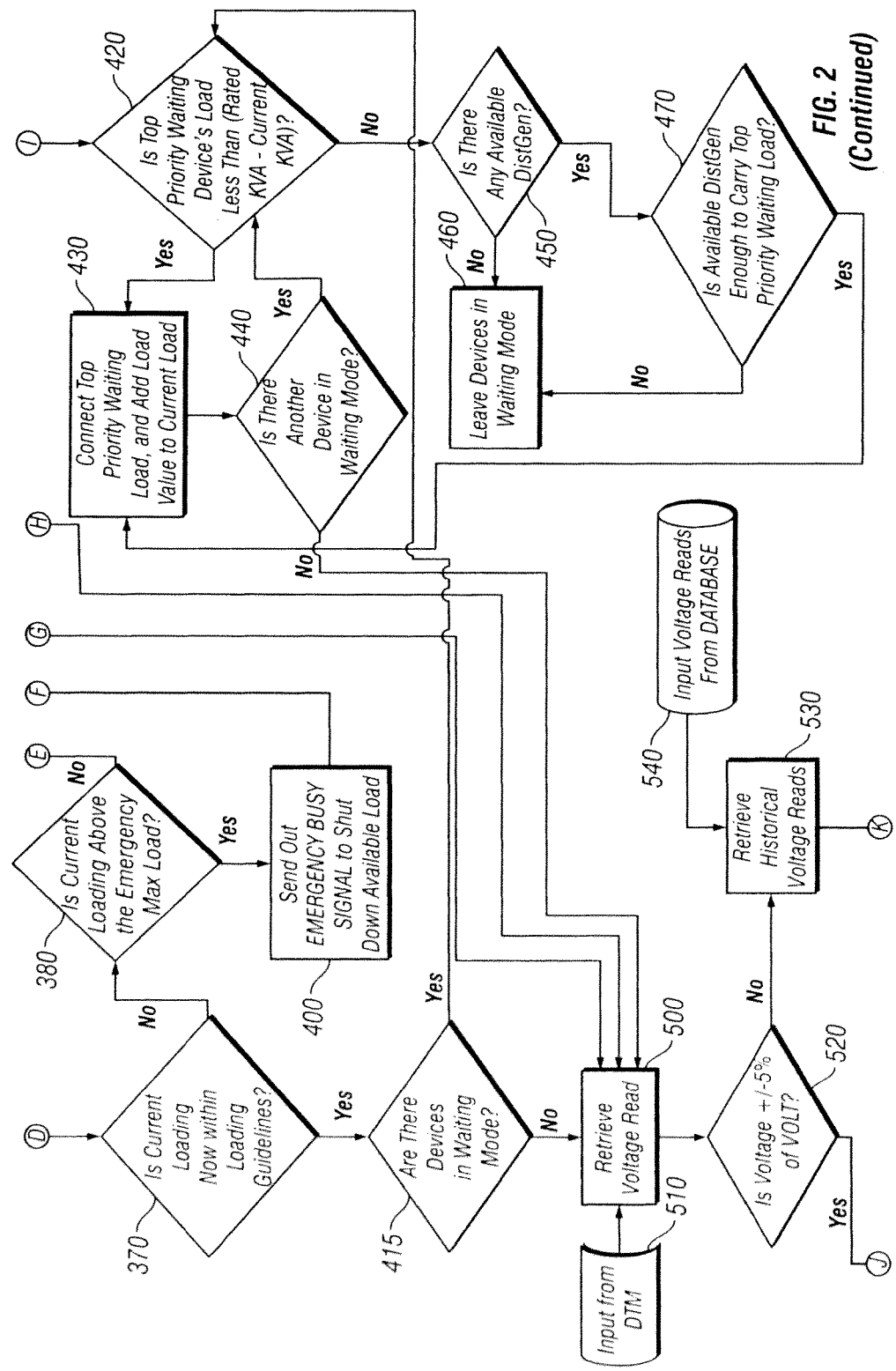
Figure 2:
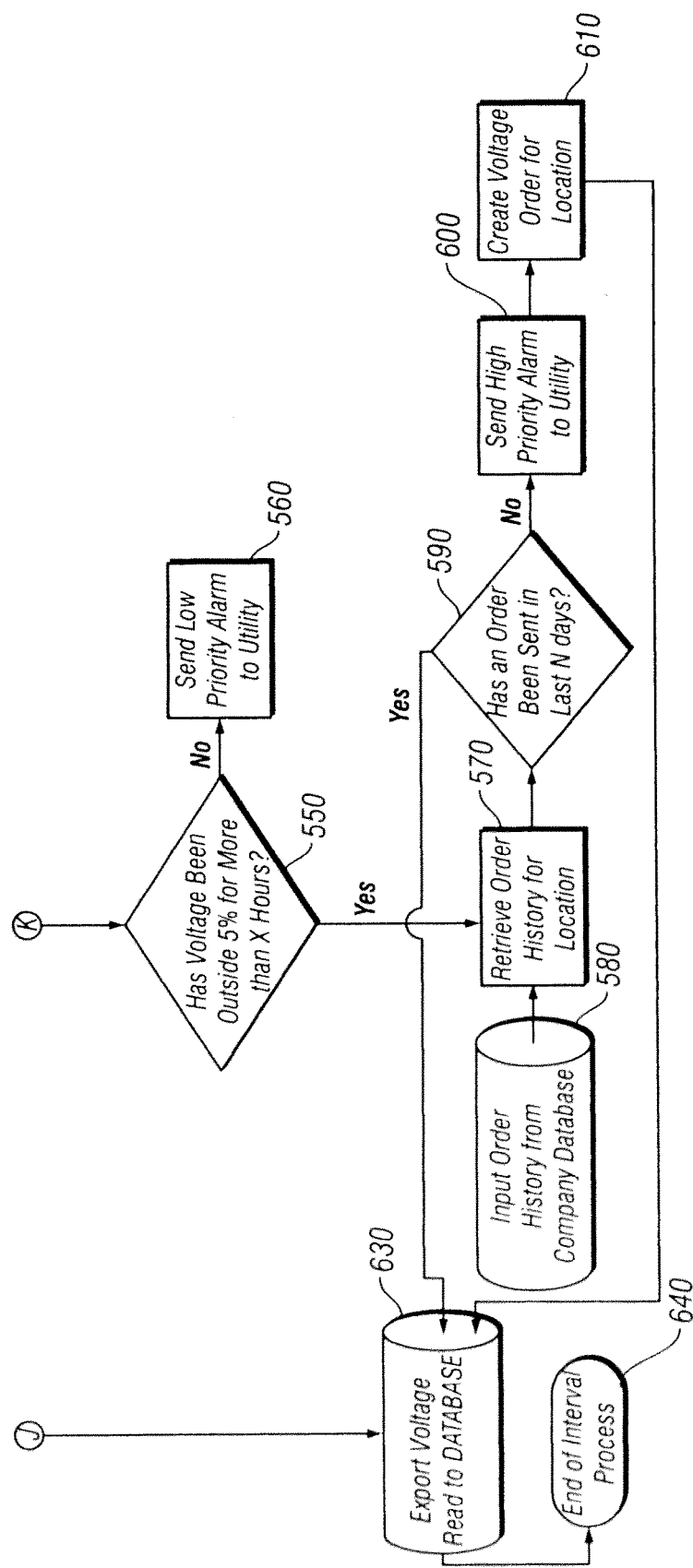

FIG. 2 is a flowchart illustrating an Interval Process 100 for monitoring and controlling electric customer load and generation in order to optimize the performance of a distribution transformer. Specifically, operation 110 involves loading the Loading Guidelines, INT (Interval), VOLT (Voltage) and KVA (Kilovolt-Ampere) into the system 10 of FIG. 1. Operation 120 entails starting the program by running the algorithm 18 residing on the processor 15. In operation 130, the system 10 retrieves the GPS location of the transformer and saves it with a timestamp. Operation 140 entails exporting the GPS and timestamp data to the Database 18.

In operation 150, the system 10 determines whether Hot Spot data is available. If so, the system uses Hot Spot Loading Guidelines for the Interval Process 100 in operation 160. If the Hot Spot data is unavailable in operation 150, the system 10 determines whether Oil Temperature data is available in operation 180. If so, the system uses Oil Temperature Loading Guidelines for the Interval Process 100 in operation 190. If the Oil Temperature data is unavailable in operation 180, the system 10 retrieves an ambient temperature reading (in Celsius) in operation 200 based upon input from a Distribution Transformer Monitor (DTM), and exports the temperature reading to the database 18 in operation 220. The DTM is a device for measuring at least the current, voltage, and ambient temperature at the transformer level.

With further reference to FIG. 2, operation 230 involves manipulating Nameplate KVA by adding 0.01 KVA for each degree C. below 30° C. and subtracting 0.015 KVA for each degree below 30° C. In operation 240, if the forecast for the Interval is higher than the current temperature (based upon a weather forecast input for a given Interval in operation 250), the system 10 re-manipulates according to the forecast. Operation 255 involves retrieving Smart Load information from each service point, including Hot Spot Loading Guidelines, Oil Temperature Loading Guidelines, and Nameplate KVA data. In addition, input from the customer equipment (e.g., EV and HVAC) is transmitted to the system 10 in operation 260. In operation 270, the Smart Load information is exported to the database 18. Operation 280 entails the system 10 receiving Smart Generation (DistGen) production and availability values for each service point, wherein additional input is received from the customer equipment (operation 290), and wherein the Smart Generation data is exported to the database 18 (operation 300). The Smart Generation values for each service point may also be referred to herein as Distributed Generation (DistGen) values representing all customer distributed generation off of a particular transformer (e.g., photovoltaic systems, battery storage, etc.). In operation 310, the system 10 retrieves current load at the transformer including input from the DTM (operation 320). In operation 330, the current load data is exported to the database 18.

Operation 340 entails determining whether the current load is exceeding the Loading Guidelines. If so, operation 350 involves the system 10 determining whether there is available Distributed Generation (DistGen). If DistGen is unavailable, the system 10 sends an alarm to the utility and starts a Busy Signal in operation 355. The Busy Signal may be used to communicate to the customer that it is not advisable to add load to the system at that particular time. In some cases, the Busy Signal may be sent to the customer when the transformer load has reached a point of maximum desired capacity. However, if DistGen is available in operation 350, the system 10 connects DistGen until the transformer is within the Loading Guidelines, or no further DistGen is available (operation 360). Operation 370 entails the system 10 determining whether current loading is now within Loading Guidelines. If not, the system 10 determines whether current loading is above the emergency maximum load in operation 380. If the emergency maximum load has not been exceeded, the Interval Process 100 proceeds to operation 355, whereby the system 10 sends an alarm to the customer and starts the Busy Signal. However, in cases where the emergency maximum load has been exceeded, the Interval Process 100 proceeds to operation 400, whereby the system 10 sends out an Emergency Busy Signal to shut down available load to the transformer, and the system 10 proceeds to send an alarm to the customer and start the Busy Signal (operation 355).

With continued reference to FIG. 2, operations 410 and 415 entail the system 10 determining whether any devices are in a waiting mode. If so, the Interval Process 100 proceeds to operation 420, wherein the system 10 determines whether the top priority waiting device has a load that is less than [RatedKVA−CurrentKVA]. If so, the Interval Process 100 proceeds to operation 430, wherein the system 10 connects the top priority waiting load and adds the load value to the current load. In operation 440, the system, 10 determines whether there is another device in waiting mode. If so, the Interval Process 100 returns to operation 420, wherein the system 10 again determines whether the top priority waiting device has a load that is less than [RatedKVA−CurrentKVA]. If not, the Interval Process 100 proceeds to operation 450, and the system determines whether there is any available DistGen. In the case where no DistGen is available, the device is left in waiting mode (operation 460). However, if DistGen is available, the Interval Process 100 moves to step 470, wherein the system 10 determines whether the available DistGen is sufficient to carry the top priority waiting load. If not, the Interval Process 100 proceeds to operation 460. If enough DistGen is available, the Interval Process 100 proceeds to operation 430.

When there are no longer any devices in waiting mode (per determinations in operations 410, 415, or 440), or following a Busy Signal being send to the customer (in operation 355), the Interval Process 100 proceeds to operation 500, wherein the system 10 retrieves a voltage read based upon input from the DTM (operation 510). In operation 520, the system 10 determines whether the voltage is +/−5% of VOLT. If not, the system retrieves historical voltage reads (operation 530) based upon input voltage reads from the database 18 (operation 540). Operation 550 entails the system 10 determining whether the voltage has been outside of the +/−5% range for more than X hours. If not, a low priority alarm is sent to the utility in operation 560. However, if the range has been exceeded for X hours in operation 560, the Interval Process 100 proceeds to operation 570, wherein the system 10 retrieves the order history for the particular location using the input order history from the company database (operation 580).

With further reference to FIG. 2, operation 590 entails the system 10 determining whether an order has been sent in the last N days. If not, a high priority alarm is sent to the utility in operation 600. Operation 610 involves the system 10 creating a voltage order for the location. Subsequent to creation of the voltage order (operation 610), or if the voltage is within +/−5% of VOLT in operation 520, or if an order has been sent in the last N days in operation 590, the Interval Process 100 proceeds to operation 630, in which the voltage read is exported to the database 18. The Interval Process terminates at operation 640.

Figure 3:
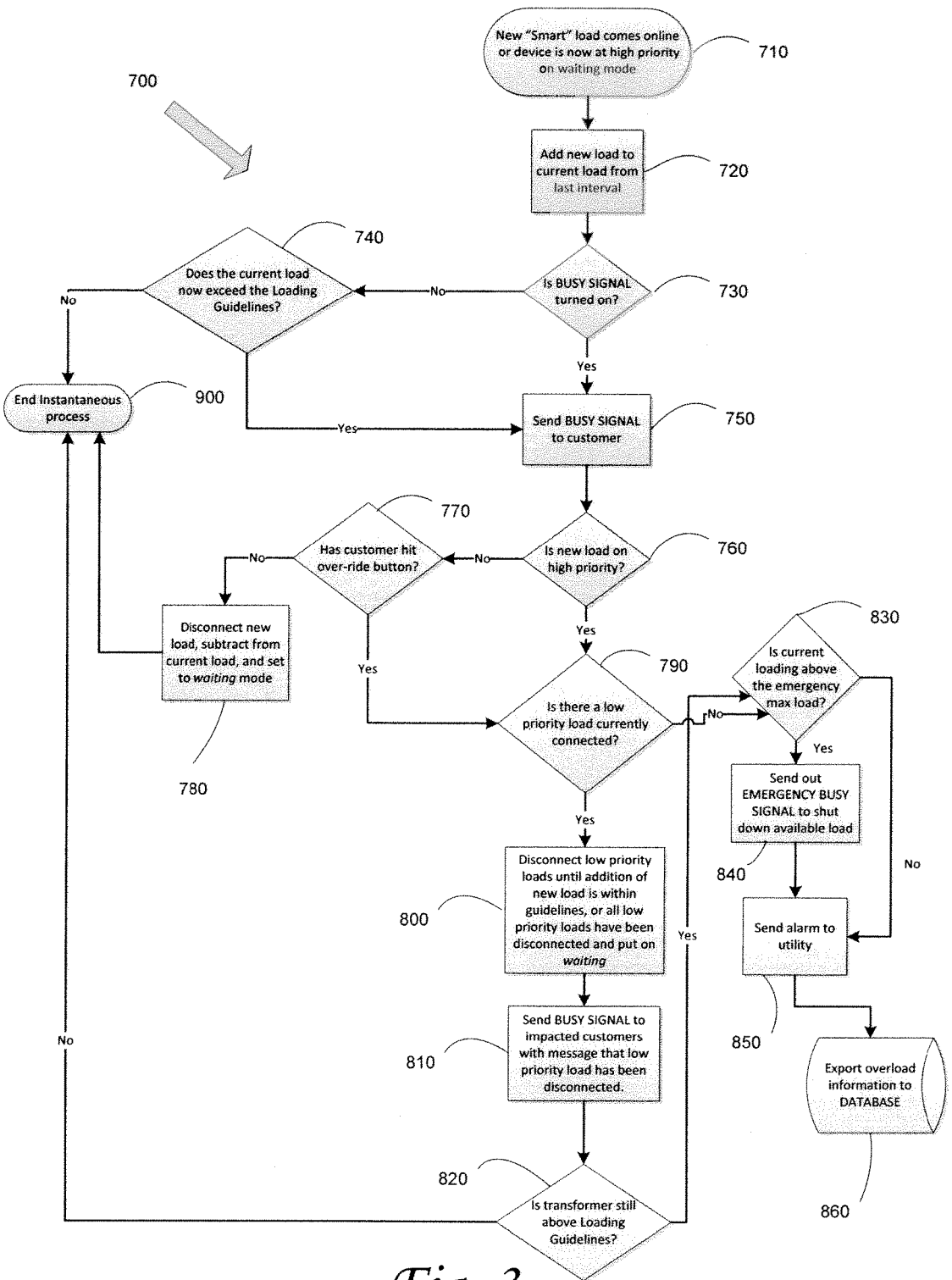
FIG. 3 is a flowchart illustrating an Instantaneous Process 700 for monitoring and controlling electric customer load and generation in order to optimize the performance of a distribution transformer, in accordance with an embodiment of the present invention.

FIG. 3 is a flowchart illustrating an Instantaneous Process 700 for monitoring and controlling electric customer load and generation in order to optimize the performance of a distribution transformer. Specifically, in operation 710, a new Smart Load comes on line or a device is now at high priority on the waiting mode. In operation 720, the system 10 adds the new load to the current load from the last interval. Operation 730 entails the system 10 determining whether the Busy Signal is turned on. If not, the Instantaneous Process 700 proceeds to operation 740, wherein the system 10 determines whether the current load exceeds the Loading Guidelines. If the Busy Signal is turned in operation 730, or the current load exceeds the Loading Guidelines in operation 740, the Instantaneous Process 700 proceeds to operation 750, wherein the system 10 sends a Busy Signal to the customer.

Operation 760 entails the system determining whether the new load is high priority. If not, the system 10 determines in operation 770 whether the customer has hit the over-ride button. If not, the system 10 disconnects the new load, subtracts this from the current load, and sets the device to waiting mode (operation 780). However, if the customer has hit the panic button in operation 770, or if the new load is on high priority in operation 760, then the Instantaneous Process 700 proceeds to operation 790, wherein the system 10 determines whether a low priority load is currently connected. If so, the system disconnects the low priority loads until the addition of the new load is within Loading Guidelines, or all low priority loads have been disconnected and put on waiting mode (operation 800). Operation 810 entails the system 10 sending a Busy Signal to the impacted customers with a message that low priority loads have been disconnected.

With further reference to FIG. 3, operation 820 involves the system, 10 determining whether the transformer is still above Loading Guidelines. If so, or if there are no low priority loads connected in operation 790, the Instantaneous Process 700 proceeds to operation 830, wherein the system 10 determines whether the current loading is above the emergency maximum load. If so, the system 10 sends an Emergency Busy Signal to shut down available load (operation 840), and sends an alarm to the utility (operation 850). If the current is not above the emergency maximum load in operation 830, the Instantaneous Process 700 proceeds directly to operation 850. Operation 860 entails exporting overload information to the database 18. Id the transformer is not above Loading Guidelines in operation 820, or the current load does not exceed Loading Guidelines in operation 740, or after setting the transformer to waiting mode in operation 780, the Instantaneous Process 700 ends at operation 900.

According to various embodiments of the invention, the system 10 may include a Waiting Mode. In some cases, customer equipment that is in the Waiting Mode is plugged into the grid at the customer premises, but blocked from operation via the system 10 due to a possible overload of the transformer. The device Priority determines when the equipment moves out of Waiting Mode and is allowed to resume normal operation. In some embodiments, all customer equipment that is controlled by the system 10 has a Priority based on how long the device takes to charge or run, and when the customer needs that device to be ready to operate. The system 10 is configured to receive such customer set parameters in order to set the appropriate Priority and base load connection. According to certain embodiments, all Priority may be over-ridden by the customer at any time, thereby allowing the load to connect whether or not there is a possible overload situation.

In some embodiments, a Waiting Mode Alarm may be employed to provide an electronic notice to the utility when a Waiting Mode event takes place. On the other hand, a Low Voltage Alarm is a setpoint used to notify the utility when the customer service Voltage or utilization Voltage drops below a predetermined threshold. The Low Voltage Alarm may interface with Smart Meter data in order to determine the service Voltage.

As set forth above, another aspect of the system 10 may comprise a transformer Busy Signal, which may be used to communicate to a customer that it is not advisable to add load to the system at that particular time. In some cases, the Busy Signal may be sent to the customer when the transformer load has reached a point of maximum desired capacity.

In further embodiments of the invention, the system 10 may be adapted to be used in connection with Revenue Protection. Specifically, the system 10 may be used in combination with Smart Meter load profile data in order to observe any imbalance of load profiles, thereby locating areas in which various parties may be stealing power.

Yet another application for the invention involves a microgrid setting, wherein a small portion of a circuit is islanded in order to isolate it from any adverse circumstances. According to such an application, the customer's distributed generation may be balanced with the customer load in such a way that the distribution transformer can be cut off from the primary electrical system, thus remaining energized during an outage elsewhere on the circuit.

As used herein, the term "set" may refer to any collection of elements, whether finite or infinite. The term "subset" may refer to any collection of elements, wherein the elements are taken from a parent set; a subset may be the entire parent set. The term "proper subset" refers to a subset containing fewer elements than the parent set. The term "sequence" may refer to an ordered set or subset. The terms "less than," "less than or equal to," "greater than," and "greater than or equal to," may be used herein to describe the relations between various objects or members of ordered sets or sequences; these terms will be understood to refer to any appropriate ordering relation applicable to the objects being ordered.

The term "tool" can be used to refer to any apparatus configured to perform a recited function. For example, tools can include a collection of one or more modules and can also be comprised of hardware, software or a combination thereof. Thus, for example, a tool can be a collection of one or more software modules, hardware modules, software/hardware modules or any combination or permutation thereof. As another example, a tool can be a computing device or other appliance on which software runs or in which hardware is implemented.

Figure 4:
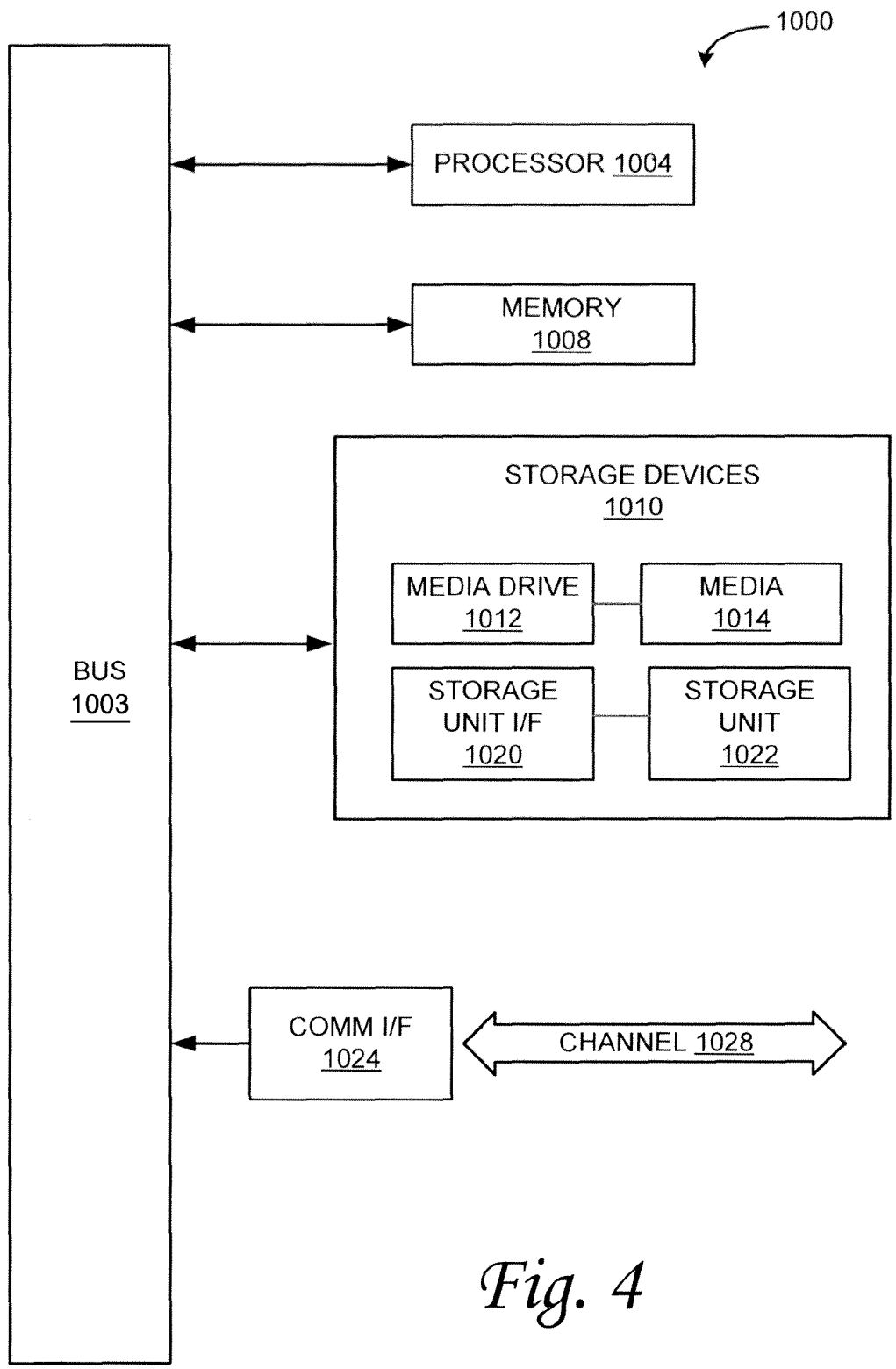
FIG. 4 is a diagram illustrating an example computing module for implementing various embodiments of the invention.

As used herein, the term "module" might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 4. Various embodiments are described in terms of this example-computing module 1000. After reading this description, it will become apparent to a person skilled in the relevant art how to implement the invention using other computing modules or architectures.

Referring now to FIG. 4, computing module 1000 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 1000 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1000 might include, for example, one or more processors, controllers, control modules, or other processing devices, such as a processor 1004. Processor 1004 might be implemented using a general-purpose or special-purpose processing engine such as, for example, a microprocessor, controller, or other control logic. In the illustrated example, processor 1004 is connected to a bus 1003, although any communication medium can be used to facilitate interaction with other components of computing module 1000 or to communicate externally.

Computing module 1000 might also include one or more memory modules, simply referred to herein as main memory 1008. For example, preferably random access memory (RAM) or other dynamic memory, might be used for storing information and instructions to be executed by processor 1004. Main memory 1008 might also be used for storing temporary variables or other intermediate information during execution of instructions to be executed by processor 1004. Computing module 1000 might likewise include a read only memory ("ROM") or other static storage device coupled to bus 1003 for storing static information and instructions for processor 1004.

The computing module 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a floppy disk drive, a magnetic tape drive, an optical disk drive, a CD, DVD or Blu-ray drive (R or RW), or other removable or fixed media drive might be provided. Accordingly, storage media 1014 might include, for example, a hard disk, a floppy disk, magnetic tape, cartridge, optical disk, a CD, DVD or Blu-ray, or other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing module 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory module) and memory slot, a PCMCIA slot and card, and other fixed or removable storage units 1022 and interfaces 1020 that allow software and data to be transferred from the storage unit 1022 to computing module 1000.

Computing module 1000 might also include a communications interface 1024. Communications interface 1024 might be used to allow software and data to be transferred between computing module 1000 and external devices. Examples of communications interface 1024 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1024 might typically be carried on signals, which can be electronic, electromagnetic (which includes optical) or other signals capable of being exchanged by a given communications interface 1024. These signals might be provided to communications interface 1024 via a channel 1028. This channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1008, storage unit 1020, media 1014, and channel 1028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1000 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
    a processor; and
    a balancing algorithm residing on the processor;
    wherein the balancing algorithm is stored on a non-transitory computer readable medium having computer executable program code embodied thereon, the computer executable program code configured to cause the system to monitor and control an electric customer load and generation in order to optimize the performance of a distribution transformer;
    wherein the processor receives a plurality of inputs and uses the balancing algorithm to determine an amount of customer load;
    wherein the inputs comprise loading guidelines including % rated KVA allowed;
    wherein the processor uses the balancing algorithm to determine an optimum dispatch of load that will prevent overload of the distribution transformer.

2. The system of claim 1, wherein the inputs further comprise: interval; nameplate KVA; and voltage.

3. The system of claim 1, wherein the % rated KVA allowed comprises a decimal based on hot spot temperature, oil temperature, and ambient temperature.

4. The system of claim 1, wherein the processor receives distributed generation values representing all customer distributed generation off of the transformer including at least photovoltaic systems and battery storage.

5. The system of claim 4, wherein the processor sends a busy signal to the customer if the customer load is exceeding the loading guidelines, and distributed generation is unavailable.

6. The system of claim 1, wherein the processor uses the balancing algorithm to determine a rating of the transformer.

7. The system of claim 1, wherein the transformer is placed in a waiting mode if the processor detects a possible transformer overload, whereby the processor is thereby blocked from normal operation.

8. The system of claim 7, wherein device priority is used to determine when the transformer moves out of the waiting mode and is allowed to resume normal operation.

9. A non-transitory computer readable medium having computer executable program code embodied thereon, the computer executable program code configured to cause a processor to monitor and control an electric customer load and generation in order to optimize the performance of a distribution transformer, by performing the steps of:
    receiving a plurality of system inputs;
    utilizing a balancing algorithm to determine an amount of customer load; and
    utilizing the balancing algorithm to determine an optimum dispatch of customer load that will prevent overload of the distribution transformer,
    wherein the plurality of system inputs comprises a plurality of inputs selected from the group consisting of: system load; transformer load; transformer type, size, and vintage; humidity; ambient temperature of transformer; transformer GPS location; price signals; individual customer load; specific equipment load; distributed generation output and type; voltage; and date/time.

10. The computer readable medium of claim 9, further comprising receiving a plurality of user inputs comprising two or more user inputs selected from the group consisting of: loading guidelines; interval; nameplate KVA; and voltage.

11. The computer readable medium of claim 10, wherein the loading guidelines include % rated KVA allowed as a decimal based on hot spot temperature, oil temperature, and ambient temperature.

12. The computer readable medium of claim 9, further comprising utilizing a balancing algorithm to determine a rating of the transformer.

13. A non-transitory computer readable medium having computer executable program code embodied thereon, the computer executable program code configured to cause a processor to monitor and control an electric customer load and generation in order to optimize the performance of a distribution transformer, by performing the steps of:
    receiving a plurality of system inputs;
    utilizing a balancing algorithm to determine an amount of customer load;
    utilizing the balancing algorithm to determine an optimum dispatch of customer load that will prevent overload of the distribution transformer; and receiving distributed generation values representing all customer distributed generation off of the transformer including at least photovoltaic systems and battery storage.

14. The computer readable medium of claim 13, further comprising determining whether the customer load is exceeding predetermined loading guidelines, and if so, determining whether there is available distributed generation.

15. A system, comprising:
    a processor; and
    a balancing algorithm residing on the processor;
    wherein the balancing algorithm is stored on a non-transitory computer readable medium having computer executable program code embodied thereon, the computer executable program code configured to cause the system to monitor and control an electric customer load and generation in order to optimize the performance of a distribution transformer;
    wherein the processor receives a plurality of system inputs and uses the balancing algorithm to determine an amount of customer load;
    wherein the processor uses the balancing algorithm to determine a rating of the transformer; and wherein the processor receives distributed generation values representing all customer distributed generation off of the transformer including at least photovoltaic systems and battery storage.

* * * * *